(12) United States Patent
Zhao et al.

(10) Patent No.: US 10,809,406 B2
(45) Date of Patent: Oct. 20, 2020

(54) ONLINE ACTIVE VIBRATION CONTROL FOR A WELLBORE LOGGING TOOL

(71) Applicant: Halliburton Energy Services, Inc., Houston, TX (US)

(72) Inventors: Yiming Zhao, Katy, TX (US); Xingyong Song, Houston, TX (US); Jason D. Dykstra, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 418 days.

(21) Appl. No.: 15/329,049

(22) PCT Filed: Aug. 7, 2014

(86) PCT No.: PCT/US2014/050049
§ 371 (c)(1),
(2) Date: Jan. 25, 2017

(87) PCT Pub. No.: WO2016/022118
PCT Pub. Date: Feb. 11, 2016

(65) Prior Publication Data
US 2017/0212264 A1    Jul. 27, 2017

(51) Int. Cl.
*G01V 1/50* (2006.01)
*E21B 23/14* (2006.01)
(Continued)

(52) U.S. Cl.
CPC .............. *G01V 1/523* (2013.01); *E21B 23/14* (2013.01); *E21B 47/017* (2020.05); *E21B 47/14* (2013.01);
(Continued)

(58) Field of Classification Search
CPC ...... G01V 1/523; G01V 2200/16; G01V 1/42; E21B 49/00; E21B 47/14; E21B 47/011;
(Continued)

(56) References Cited

U.S. PATENT DOCUMENTS 4,796,237 A * 1/1989 Hutchens ................ G01S 7/527
181/105
5,416,845 A    5/1995 Shen
(Continued)

FOREIGN PATENT DOCUMENTS

JP    2004200934 A * 7/2004 ............... H04R 3/04

OTHER PUBLICATIONS

International Search Report and Written Opinion issued in related PCT/US2014/050049 dated Apr. 30, 2015, 22 pages.
International Preliminary Report on Patentability issued in related PCT/US2014/050049 dated Sep. 30, 2016, 16 pages.

*Primary Examiner* — Ian J Lobo
(74) *Attorney, Agent, or Firm* — John W. Wustenberg; Baker Botts L.L.P.

(57) ABSTRACT

In accordance with some embodiments of the present disclosure, a method for vibration control for a wellbore logging tool is disclosed. The method may include measuring an initial output signal of the wellbore logging tool. Additionally, the method may include generating a first braking signal based on the initial output signal of the wellbore logging tool. The method may further include transmitting the first braking signal to the wellbore logging tool. The first braking signal may be designed to dampen the vibration of the wellbore logging tool.

20 Claims, 5 Drawing Sheets

(51) Int. Cl.
*E21B 47/14* (2006.01)
*G01V 1/52* (2006.01)
*G10K 11/178* (2006.01)
*E21B 47/017* (2012.01)
*E21B 49/00* (2006.01)
*G01V 1/42* (2006.01)

(52) U.S. Cl.
CPC ............ *E21B 49/00* (2013.01); *G10K 11/178* (2013.01); *G01V 1/42* (2013.01); *G01V 2200/16* (2013.01); *G10K 2210/122* (2013.01); *G10K 2210/129* (2013.01)

(58) Field of Classification Search
CPC .................. E21B 23/14; G10K 11/178; G10K 2210/122; G10K 2210/129
See application file for complete search history.

(56) References Cited

U.S. PATENT DOCUMENTS

| | | | |
|---|---|---|---|
| 5,936,913 | A | 8/1999 | Gill et al. |
| 6,580,177 | B1* | 6/2003 | Hagood, IV ........... H02N 2/181 |
| | | | 290/1 R |
| 6,671,224 | B1 | 12/2003 | Pabon |
| 6,837,332 | B1 | 1/2005 | Rodney |
| 7,639,562 | B2 | 12/2009 | Patterson et al. |
| 2008/0069368 | A1* | 3/2008 | Shumard .............. G10K 11/178 |
| | | | 381/71.6 |
| 2009/0230969 | A1 | 9/2009 | Hall et al. |
| 2010/0230093 | A1 | 9/2010 | Knudsen et al. |
| 2014/0192618 | A1 | 7/2014 | Pabon et al. |
| 2015/0177404 | A1* | 6/2015 | Pabon ...................... G01V 1/46 |
| | | | 367/28 |

\* cited by examiner

ONLINE ACTIVE VIBRATION CONTROL FOR A WELLBORE LOGGING TOOL

CROSS-REFERENCE TO RELATED APPLICATION

The present application is a U.S. National Stage Application of International Application No. PCT/US2014/050049 filed Aug. 7, 2014, which is incorporated herein by reference in its entirety for all purposes.

TECHNICAL FIELD

The present disclosure relates generally to well drilling and hydrocarbon recovery operations and, more particularly, to a system and method of vibration control for a wellbore logging tool.

BACKGROUND

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

When performing subterranean operations, it is often desirable to obtain information about the subterranean formation. One method of obtaining information about the formation is the use of a sonic well logging tool. A sonic well logging tool may emit an acoustic signal, which propagates through the formation to at least one receiver. The travel time of the acoustic signal from the tool to the receiver may be used to calculate the speed of the acoustic tone through the formation. Properties of the formation may be determined by comparing the speed of the acoustic tone to the speed of sound through various types of rock and fluid that may be encountered in subterranean operations.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
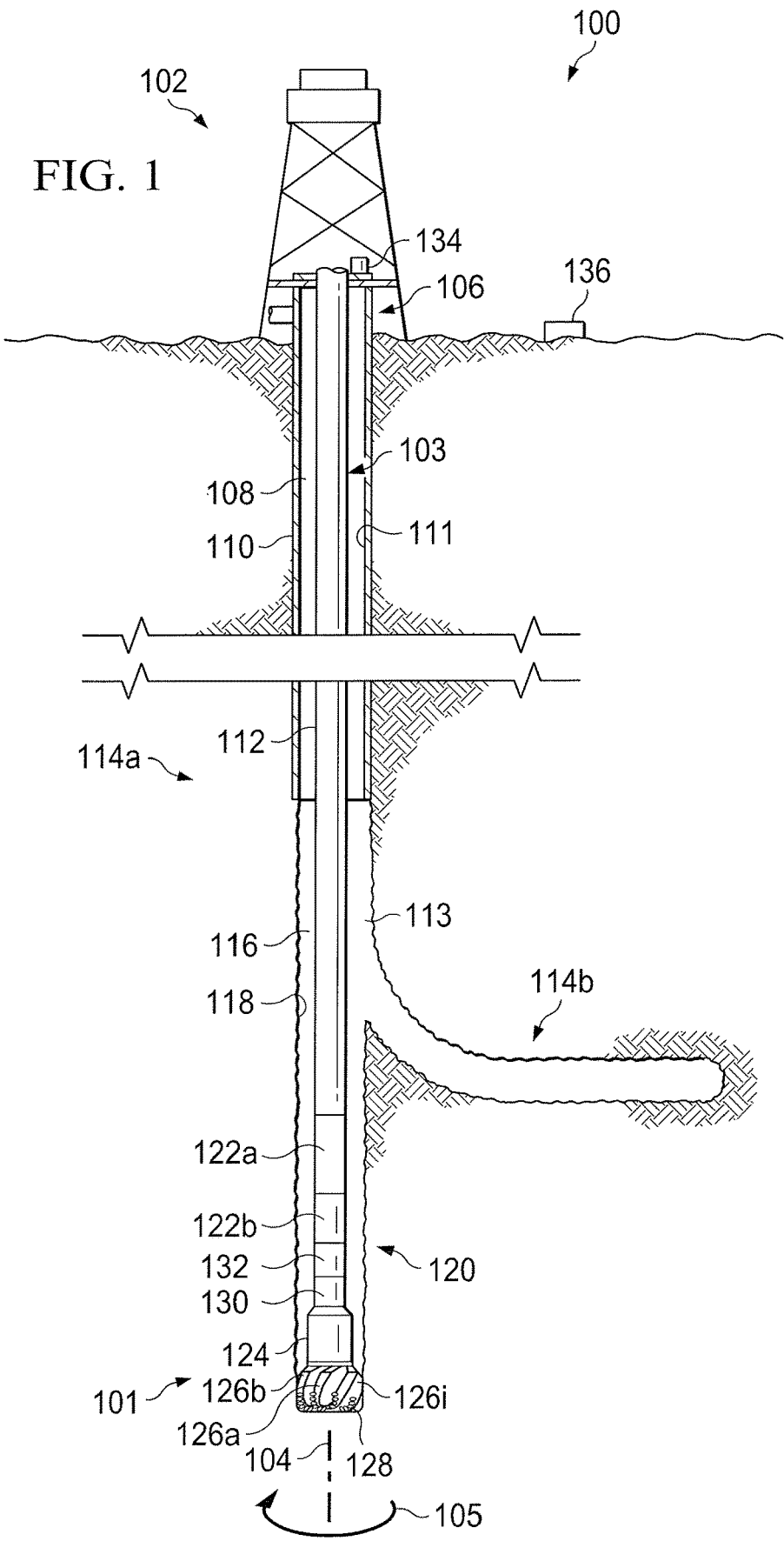
FIG. 1 illustrates an elevation view of an example embodiment of a drilling system used in an illustrative logging-while-drilling (LWD) environment, in accordance with some embodiments of the present disclosure.
Figure 2:
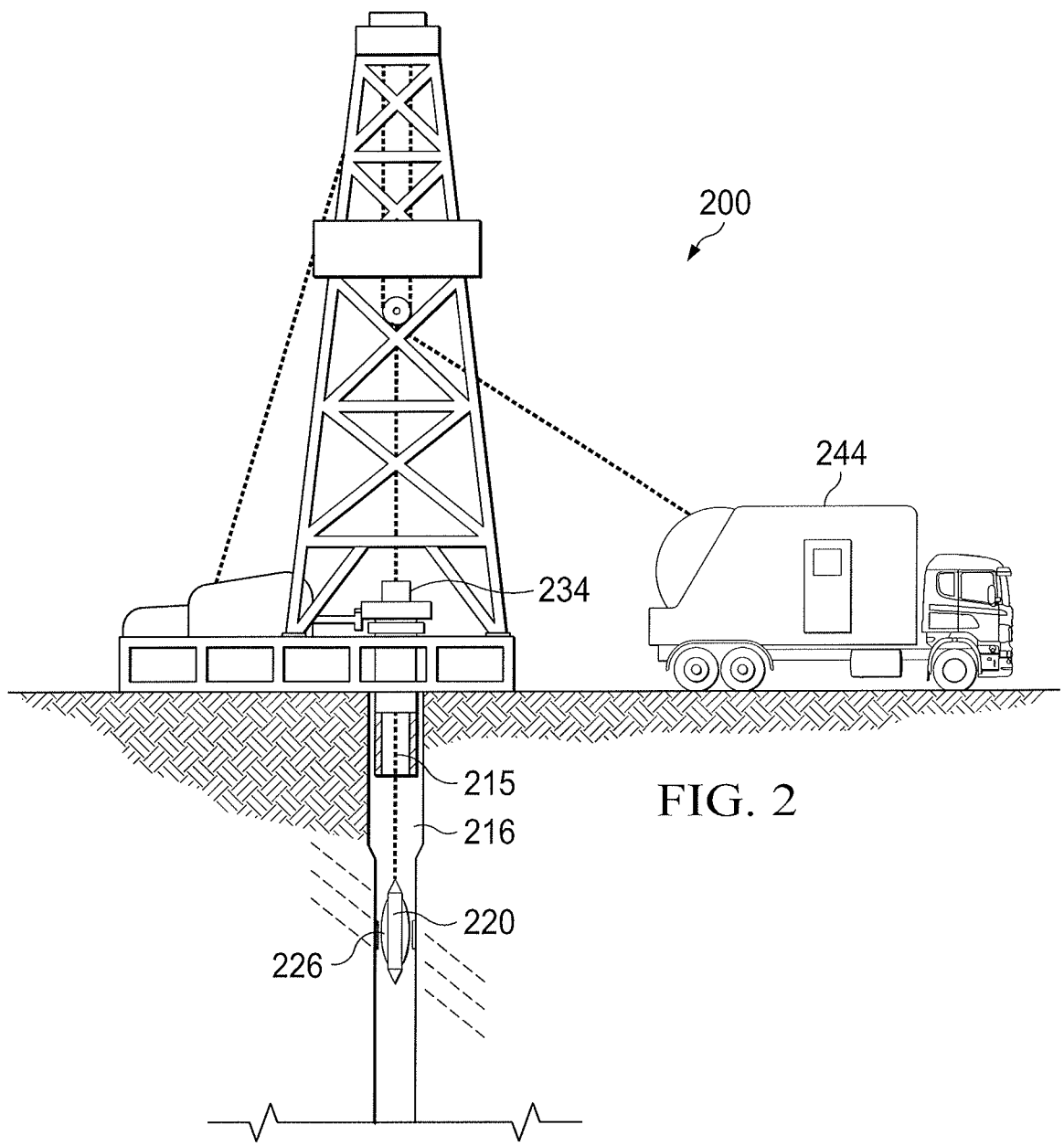
FIG. 2 illustrates an elevation view of an example embodiment of a downhole system used in an illustrative logging environment with the drill string removed, in accordance with some embodiments of the present disclosure.

The present disclosure describes an automated control system and method to optimize vibration control in a wellbore logging tool. The wellbore logging tool may be located on a drill string, as shown in FIG. 1, or on a wireline, as shown in FIG. 2. The wellbore logging tool may be any suitable type of wellbore logging tool, including a sonic logging tool that emits a signal in the form of an acoustic waveform. To improve the efficiency of a subterranean operation, it may be desirable to avoid outside acoustic disturbances, such as vibration or oscillation of the sonic logging tool. In some embodiments, components of the sonic logging tool, such as a transmitter or an actuator, may vibrate due to excitations during the process of generating the acoustic signal. The vibration of the components of the sonic logging tool, also known as "ringing," may be in the frequency range of the emitted acoustic signal. The ringing may result in lower quality data, may increase the time required to perform the logging, and may require more energy input into the logging tool. Accordingly, a system and method may be designed in accordance with the teachings of the present disclosure to reduce the ringing of the logging tool components and improve the quality of the acoustic signal emitted by the sonic logging tool, reduce the time and cost of performing wellbore logging, and reduce the total energy input requirements for the logging tool. Although the automated control system and method described herein are directed to vibration control in a sonic logging tool, the vibration control system and method may be adapted to optimize other aspects of a subterranean operation including other types of wellbore logging tools. Embodiments of the present disclosure and its advantages are best understood by referring to FIGS. 1 through 5, where like numbers are used to indicate like and corresponding parts.

FIG. 1 illustrates an elevation view of an example embodiment of drilling system 100 used in an illustrative logging-while-drilling (LWD) environment, in accordance with some embodiments of the present disclosure. Modern petroleum drilling and production operations use information relating to parameters and conditions downhole. Several methods exist for collecting downhole information during subterranean operations, including LWD and wireline logging. In LWD, data is typically collected during a drilling process, thereby avoiding any need to remove the drilling assembly to insert a wireline logging tool. LWD consequently allows an operator of a drilling system to make accurate real-time modifications or corrections to optimize performance while minimizing down time. In wireline logging, a logging tool may be suspended in the wellbore from a wireline and may take measurements of the wellbore and subterranean formation.

Drilling system 100 may include well surface or well site 106. Various types of drilling equipment such as a rotary table, drilling fluid pumps and drilling fluid tanks (not expressly shown) may be located at well surface or well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

Drilling system 100 may also include drill string 103 associated with drill bit 101 that may be used to form a wide variety of wellbores or bore holes such as generally vertical wellbore 114a or generally horizontal 114b wellbore or any other angle, curvature, or inclination. Various directional drilling techniques and associated components of bottom hole assembly (BHA) 120 of drill string 103 may be used to form horizontal wellbore 114b. For example, lateral forces may be applied to BHA 120 proximate kickoff location 113 to form generally horizontal wellbore 114b extending from generally vertical wellbore 114a. The term "directional drilling" may be used to describe drilling a wellbore or portions of a wellbore that extend at a desired angle or angles relative to vertical. The desired angles may be greater than normal variations associated with vertical wellbores. Direction drilling may also be described as drilling a wellbore deviated from vertical. The term "horizontal drilling" may be used to include drilling in a direction approximately ninety degrees (90°) from vertical but may generally refer to any wellbore not drilled only vertically. "Uphole" may be used to refer to a portion of wellbore 114 that is closer to well surface 106 via the path of the wellbore 114. "Downhole" may be used to refer to a portion of wellbore 114 that is further from well surface 106 via the path of the wellbore 114.

Wellbore 114 may be defined in part by casing string 110 that may extend from well surface 106 to a selected downhole location. Portions of wellbore 114, as shown in FIG. 1, that do not include casing string 110 may be described as "open hole." Various types of drilling fluid may be pumped from well surface 106 through drill string 103 to attached drill bit 101. The drilling fluids may be directed to flow from drill string 103 to respective nozzles passing through rotary drill bit 101. The drilling fluid may be circulated back to well surface 106 through annulus 108 defined in part by outside diameter 112 of drill string 103 and inside diameter 118 of wellbore 114. Inside diameter 118 may be referred to as the "sidewall" of wellbore 114. Annulus 108 may also be defined by outside diameter 112 of drill string 103 and inside diameter 111 of casing string 110. Open hole annulus 116 may be defined as sidewall 118 and outside diameter 112.

BHA 120 may be formed from a wide variety of components configured to form wellbore 114. For example, components 122a, and 122b of BHA 120 may include, but are not limited to, drill bits (e.g., drill bit 101), coring bits, drill collars, rotary steering tools, directional drilling tools, downhole drilling motors, reamers, hole enlargers or stabilizers. The number and types of components 122 included in BHA 120 may depend on anticipated downhole drilling conditions and the type of wellbore that will be formed by drill string 103 and rotary drill bit 101. BHA 120 may also include various types of well logging tools and other downhole tools associated with directional drilling of a wellbore. Examples of logging tools and/or directional drilling tools may include, but are not limited to, acoustic, neutron, gamma ray, density, photoelectric, nuclear magnetic resonance, induction, resistivity, caliper, coring, seismic, rotary steering and/or any other commercially available well tools. Further, BHA 120 may also include a rotary drive (not expressly shown) connected to components 122a, and 122b and which rotates at least part of drill string 103 together with components 122a, and 122b.

In the illustrated embodiment, logging tool 130 may be integrated with BHA 120 near drill bit 101 (e.g., within a drilling collar, for example a thick-walled tubular that provides weight and rigidity to aid in the drilling process, or a mandrel). In certain embodiments, drilling system 100 may include control unit 134, positioned at the surface, in drill string 103 (e.g., in BHA 120 and/or as part of logging tool 130) or both (e.g., a portion of the processing may occur downhole and a portion may occur at the surface). Control unit 134 may include a control system or a control algorithm for logging tool 130. Control unit 134 may be communicatively coupled to logging tool 130 and, in one or more embodiments, may be a component of logging tool 130. In certain embodiments, a control system, an algorithm, or a set of machine-readable instructions may cause control unit 134 to generate and transmit an input signal to one or more elements of logging tool 130. The input signal may be a drive signal (e.g., a signal used to generate the acoustic signal) or a braking signal (e.g., a signal used to dampen the vibration of logging tool 130). For example, control unit 134 may generate a braking signal for logging tool 130 based on the estimated vibration of logging tool 130, as discussed in more detail with reference to FIG. 4.

Logging tool 130 may be integrated into drilling system 100 at any point along the drill string 103. Logging tool 130 may include receivers (e.g., antennas) and/or transmitters capable of receiving and/or transmitting one or more acoustic signals. The acoustic signals may facilitate recording measurements to determine the properties of the subterranean formation, including the type of rock and/or liquid (e.g., water, gas, or oil) in the formation. The transmitter may include any type of transmitter suitable for generating an acoustic signal, such as a solenoid or piezoelectric shaker. In some embodiments, logging tool 130 may include a transceiver array that functions as both a transmitter and a receiver. A drive signal may be transmitted by control unit 134 to logging tool 130 to cause logging tool 130 to emit an acoustic signal. As the bit extends wellbore 114 through the formations, logging tool 130 may collect measurements relating to various formation properties as well as the tool orientation and position and various other drilling conditions. In some embodiments, logging tool 130 may include sensors to provide measurements of an output signal of logging tool 130, such as the voltage of the logging tool. The output signal of logging tool 130 may be used to estimate the vibration of logging tool 130. Telemetry sub 132 may be included on drill string 103 to transfer the measurements to surface receiver 136 and/or to receive commands from control unit 134 (when control unit 134 is at least partially located on the surface). Telemetry sub 132 may transmit downhole data to a surface receiver 30 and/or receive commands from the surface receiver 30. Telemetry sub 132 may transmit data through one or more wired or wireless communications channels (e.g., wired pipe or electromagnetic propagation). Alternatively, telemetry sub 132 may transmit data as a series of pressure pulses or modulations within a flow of drilling fluid (e.g., mud-pulse or mud-siren telemetry), or as a series of acoustic pulses that propagate to the surface through a medium, such as the drill string. Drilling system 100 may also include facilities (not expressly shown) that include computing equipment configured to collect, process, and/or store the measurements received from receivers on logging tool 130 and/or surface receiver 136. The facilities may be located onsite at the wellbore or offsite at a location away from the wellbore.

In some embodiments it may be difficult to obtain a model or a model may not provide the desired level of accuracy. This may be due to the signal having a small magnitude or due to the changing conditions of the components of logging tool 130, such as an amplifier or a transmitter. Therefore, it may be advantageous to estimate the vibration of logging tool 130 without using a model that describes the response of logging tool 130 corresponding to an input to logging tool 130. The vibration of logging tool 130 may be described as a second order linear oscillating system by using three primary variables: magnitude, phase, and frequency. Values for the primary variables may be used to provide vibration control for logging tool 130 without using a model of the vibration of logging tool 130.

Control unit 134 may transmit an input signal (e.g., a drive signal) to logging tool 130 that causes logging tool 130 to generate an acoustic signal. The input signal may be any suitable type of signal that causes logging tool 130 to generate an acoustic signal, such as a voltage or a current. The acoustic signal may propagate through the subterranean formation to at least one receiver, such as surface receiver 136. Surface receiver 136 may record the elapsed time between when the acoustic signal is emitted by logging tool 130 and when the acoustic signal is received by surface receiver 136. The elapsed time may be used to calculate the speed of the acoustic signal through the subterranean formation, which may be compared to known values for the speed of sounds through various types of rocks and fluid to determine the properties of the subterranean formation.

When logging tool 130 emits an acoustic signal, components of logging tool 130 may be excited and may vibrate or oscillate. The frequency of the vibrations may be within the frequency range of the acoustic signal and may reduce the quality of the acoustic signal or may result in a longer operating period of logging tool 130 and may reduce the accuracy of measurements used to determine the properties of the subterranean formation. To reduce the impact of the vibrations, control unit 134 may include a vibration control system (shown in more detail in FIG. 3A) to dampen the vibrations of one or more components of logging tool 130. The vibration of logging tool 130 may continue after the drive signal causes logging tool 130 to emit an acoustic signal and may continue to affect the measurements of the subterranean formation. The vibration control system may wait for a period of time (e.g., a listening period) to estimate the vibration of logging tool 130. After the listening period, the vibration control system may transmit a braking signal to logging tool 130. In some embodiments, the vibration control system may be a component of logging tool 130, and therefore the braking signal may instead be provide to a component of logging tool 130, such as an amplifier. The braking signal may be a current or a voltage transmitted to logging tool 130 to dampen the vibration of logging tool 130. In some embodiments, control unit 134 may generate and transmit both the drive signal and the braking signal. In other embodiments, more than one control units 134 may be used to generate and transmit the drive signal and the braking signal.

To generate a braking signal, after control unit 134 transmits a drive signal to logging tool 130, the vibration control system may direct control unit 134 to suppress an input signal to logging tool 130. No input signal may be transmitted for a period of time sufficient to allow any transient response of one or more components of the output signal, caused by the drive signal, to die out. After the transient response component of the output signal, initiated by drive signal, has vanished, the output signal may be provided for a period of time, which may be referred to as the "listening period." During this listening period, the input signal to logging tool 130 may remain suppressed. The listening period may depend on the damping characteristics of logging tool 130 and its components but may be long enough to monitor and provide the vibration and output signal of logging tool 130. Additionally, the listening period may have a duration sufficient to provide a desired level of accuracy for estimating the vibration of logging tool 130 and may be variable or adjustable based on the amplitude of the vibration of logging tool 130. For example, a vibration having a larger amplitude may require a shorter listening period than a vibration having a smaller amplitude.

During the listening period, the vibration control system may provide the output signal of logging tool 130. The output signal may be composed of three major components: an input component generated by the input signal transmitted by control unit 134 to logging tool 130; a vibration component generated by the vibration of one or more components of logging tool 130; and a residual component generated by the transient response of components of logging tool 130 immediately after the input signal changes. The three components may depend on the characteristics and working conditions of logging tool 130.

When the input signal is not zero, the total output signal of logging tool 130 may not be accurately provided because the input component may be large compared to the other components of the output signal and may prevent the measurement of the other components. Therefore the output signal may be provided only when the input signal is suppressed and the transient responses in the output signal of logging tool 130 have vanished and the output signal may contain only the component generated by the vibration of logging tool 130.

The vibration component of the output signal of logging tool 130 may depend on the type of logging tool 130 and the mechanism used to generate the acoustic signal. For example, if logging tool 130 uses an electromagnetic mechanism to generate the acoustic signal, the vibration component may be generated by the relative motion between a coil and a permanent magnet in logging tool 130. This may be referred to as the "back-EMF signal." As another example, if logging tool 130 uses a piezoelectric mechanism to generate the acoustic signal, the vibration component may be generated by the varying pressure on the piezoelectric mechanism.

The residual component of the output signal of logging tool 130 may be generated by coil induction, capacitors in logging tool 130, and/or other suitable components in logging tool 130. There may be other components of the output signal in addition to the input component, the vibration component, and the residual component, but the other components may be minor and may not have a significant effect on the output signal. As an example, when the vibration component is generated by the relative motion between a coil and a permanent magnet in logging tool 130, the output signal may be measured by, while input voltage is suppressed and the transient signals have dissipated, recording the back electromotive force (EMF) signal.

Once the listening period has elapsed and the output signal of logging tool 130 is provided, the vibration control system may estimate the vibration of logging tool 130 based on the provided output signal. The vibration control system may estimate the magnitude, phase, and frequency of the vibrations of logging tool 130 by using any known method for estimating the vibration of a second-order linear oscillatory system, such as by using experimental results or mathematical models.

After estimating the vibration of logging tool 130, the vibration control system may generate a braking signal based on the estimated vibration and/or the provided output signal of logging tool 130. The vibration control system may generate the braking signal such that the effect of the braking signal on the vibration of logging tool 130 is optimized. For example, the braking signal may be generated to begin when the vibration of logging tool 130 is at a particular point in the vibration cycle such that the braking signal will have the maximum damping effect on logging tool 130. Additionally, in embodiments where a braking signal has previously been generated, the braking signal may be adjusted based on the effectiveness of the previously generated braking signal.

The braking signal may be generated based on the use of mathematical formulas representing a collection of parameters or through the use of pre-determined template waveforms. For example, the braking signal may be generated based on the formula $$u(t)=Ae^{-\tau(t-t_s)}\sin(\omega(t-t_s)) \quad (1)$$

where A is the magnitude of the braking signal, $\omega$ is the frequency, t is the time, $t_s$ is the start time of the braking signal, and $\tau$ is the decay rate.

In an embodiment using a pre-determined template waveform, the template may be g(t) and the braking signal generated based on the formula $$u(t)=ae^{-b(t-t_s)}g(c(t-t_s)) \quad (2)$$

where a, b, c and $t_s$ are constants used to adjust the magnitude, decay rate, frequency and starting time of the braking signal.

The vibration control system may direct control unit 134 to transmit the braking signal to logging tool 130. The braking signal may not be transmitted to logging tool 130 during the listening period due to the necessity of the input component of the output signal of logging tool 130 being suppressed during the listening period in order to provide the output signal of logging tool 130. The braking signal may cause logging tool 130 to vibrate offset from the vibration monitored during the listening period. The effects of the braking signal and the offset vibration may dampen, or cancel out, the vibration of logging tool 130. For example, the braking signal may dampen the vibration of an acoustic transmitter included in logging tool 130.

After the braking signal is transmitted to logging tool 130, the vibration control system may perform an additional listening period to determine the vibration of logging tool 130 after the braking signal. The vibration control system may determine the vibration of logging tool 130 by using similar methods as described with respect to determining the vibration of logging tool 130 after logging tool 130 emits an acoustic tone. For example, the vibration control system may suppress the input signal, provide the output signal of logging tool 130, and estimate the vibration of logging tool 130. After the additional listening period, the vibration control system may determine whether to generate a second braking signal. A second braking signal may be used in situations where the vibration of logging tool 130 may be above a threshold value after the first braking signal has been transmitted. The threshold value may be set based on a level of vibration that may be deemed to not impair the results of the subterranean operations. For example, the threshold value may be a level of vibration where, when logging tool 130 vibrates at an amplitude below the threshold value, the quality of the acoustic signal is not decreased and the accuracy of determining the properties of the formation is not affected by the vibration of logging tool 130.

The first braking signal may be insufficient to damp out the vibration of logging tool 130 due to factors such as measurement noise or estimation error. The vibration control system may complete any number of listening periods and generate braking signals after those listening periods, as needed to dampen the vibration of logging tool 130 below the threshold value. The vibration control system may dampen the vibration of logging tool 130 in a single firing cycle, as described, or over multiple firing cycles. A "firing cycle" refers to an operating cycle of logging tool 130 that includes a single drive signal and one or more braking signals. In an embodiment including multiple firing cycles, the output signal of logging tool 130, provided during a listening period of a previous firing cycle, and the effect of a previous braking signal may be used to improve the braking signal generated by the vibration control system in a subsequent firing cycle.

Drilling system 100 may also include rotary drill bit ("drill bit") 101. Drill bit 101 may include one or more blades 126 that may be disposed outwardly from exterior portions of rotary bit body 124 of drill bit 101. Blades 126 may be any suitable type of projections extending outwardly from rotary bit body 124. Drill bit 101 may rotate with respect to bit rotational axis 104 in a direction defined by directional arrow 105. Blades 126 may include one or more cutting elements 128 disposed outwardly from exterior portions of each blade 126. Blades 126 may also include one or more depth of cut controllers (not expressly shown) configured to control the depth of cut of cutting elements 128. Blades 126 may further include one or more gage pads (not expressly shown) disposed on blades 126. Drill bit 101 may be designed and formed in accordance with teachings of the present disclosure and may have many different designs, configurations, and/or dimensions according to the particular application of drill bit 101.

At various times during the drilling process, drill string 103 may be removed from wellbore 114 and a wellbore logging tool may be used to obtain information about the subterranean formation. FIG. 2 illustrates an elevation view of an example embodiment of drilling system 200 used in an illustrative logging environment with the drill string removed, in accordance with some embodiments of the present disclosure. Subterranean operations may be conducted using wireline system 220 once the drill string has been removed, though, at times, some or all of the drill string may remain in wellbore 114 during logging with wireline system 220. Wireline system 220 may include one or more logging tools 226 that may be suspended in wellbore 216 by conveyance 215 (e.g., a cable, slickline, or coiled tubing). Logging tool 226 may be similar to logging tool 130, as described with reference to FIG. 1. Logging tool 226 may be communicatively coupled to conveyance 215. Conveyance 215 may contain conductors for transporting power to wireline system 220 and telemetry from logging tool 226 to logging facility 244. Alternatively, conveyance 215 may lack a conductor, as is often the case using slickline or coiled tubing, and wireline system 220 may contain a control unit similar to control unit 134, shown in FIG. 1, that contains memory, one or more batteries, and/or one or more processors for performing operations and storing measurements. In certain embodiments, system 200 may include control unit 234, positioned at the surface, in the wellbore (e.g., in conveyance 215 and/or as part of logging tool 226) or both (e.g., a portion of the processing may occur downhole and a portion may occur at the surface). Control unit 234 may include a control system or a control algorithm for logging tool 226. Control unit 234 may be communicatively coupled to logging tool 226 and, in one or more embodiments, may be a component of logging tool 226. In certain embodiments, a control system, an algorithm, or a set of machine-readable instructions may cause control unit 234 to generate and transmit an input signal to one or more elements of logging tool 226. The input signal may be a drive signal (e.g., a signal used to generate the acoustic signal) or a braking signal (e.g., a signal used to dampen the vibration of logging tool 226). Logging facility 244 (shown in FIG. 2 as a truck, although it may be any other structure) may collect measurements from logging tool 226, and may include computing facilities for controlling, processing, or storing the measurements gathered by logging tool 226. The computing facilities may be communicatively coupled to logging tool 226 by way of conveyance 215 and may operate similarly to control unit 134 and/or surface receiver 136, as shown in FIG. 1. An example of a computing facility is described with more detail with reference to FIG. 3A.

As described with respect to logging tool 130 in FIG. 1, logging tool 226 may vibrate, or ring, after emitting an acoustic signal during a subterranean operation. The ringing may be in the frequency range of the acoustic signal emitted by the logging tool and may decrease the quality of the acoustic signal. The decrease in signal quality may increase the logging time or may result in higher energy requirements for logging tool 226. Therefore, it may be advantageous to reduce the ringing of one or more components of logging tool 226, as discussed in further detail with respect to FIG. 4. For example, a system or method may dampen the ringing of logging tool 226 and may improve the quality of the acoustic signal. One method for dampening the ringing of logging tool 226 may be through the use of a vibration control system. A vibration control system, which may be included in the computing facilities of logging facility 244, control unit 234, or a component of logging tool 226, may include a listening period, after an input signal is transmitted to logging tool 226, to provide the output signal of logging tool 226. The input signal may be a drive signal (e.g., a signal used to generate the acoustic signal) or a braking signal (e.g., a signal used to dampen the vibration of logging tool 226). The vibration of logging tool 226 may be estimated based on the provided output signal and the estimated vibration may be used to generate a braking signal. Logging facility 244 may transmit the braking signal to logging tool 226 to dampen the vibration of logging tool 226. As described in more detail with respect to FIG. 1, the vibration control system may repeat the listening period, vibration estimation, and braking signal generation and transmission, until the vibration of logging tool 226 is below a threshold value. As such, systems and methods designed according to the present disclosure may enable more accurate and more efficient measurements of the subterranean formation.

Figure 3A:
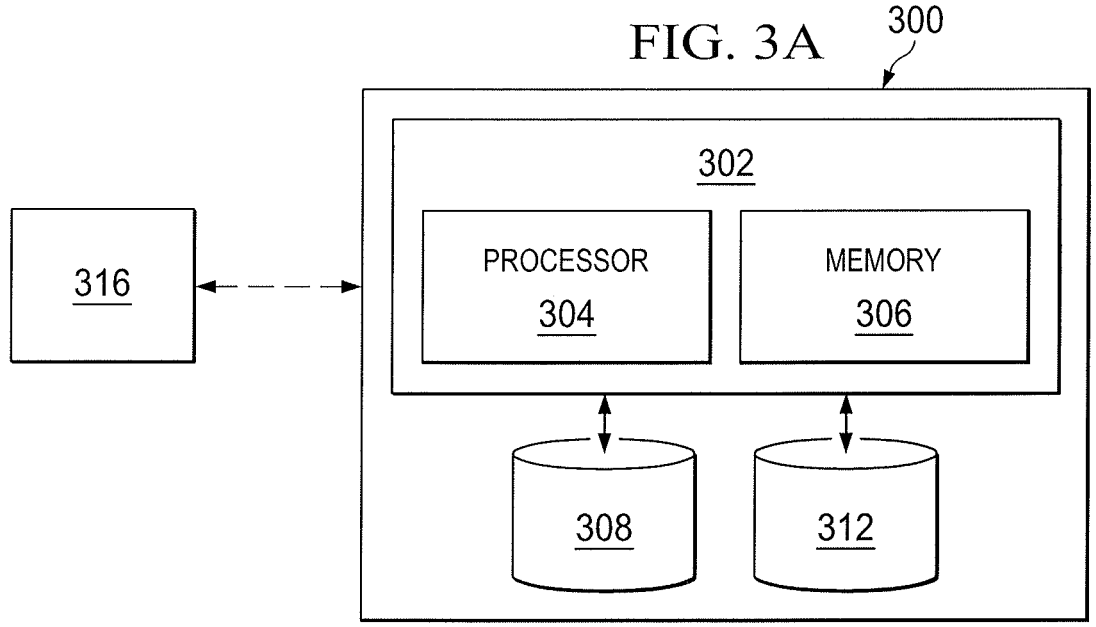
FIG. 3A illustrates a block diagram of an exemplary vibration control system for a wellbore logging tool, in accordance with some embodiments of the present disclosure.

FIG. 3A illustrates a block diagram of an exemplary control unit 300 for a logging tool, in accordance with some embodiments of the present disclosure. Control unit 300 may be configured to transmit an input signal to and perform vibration control for a wellbore logging tool, such as logging tool 130 or logging tool 226. In some embodiments, control unit 300 may include vibration control system 302. Vibration control system 302 may be used to perform the steps of method 400 as described with respect to FIG. 4. Vibration control system 302 may include any suitable components. For example, in some embodiments, vibration control system 302 may include processor 304. Processor 304 may include, for example a microprocessor, microcontroller, digital signal processor (DSP), application specific integrated circuit (ASIC), or any other digital or analog circuitry configured to interpret and/or execute program instructions and/or process data. In some embodiments, processor 304 may be communicatively coupled to memory 306. Processor 304 may be configured to interpret and/or execute program instructions and/or data stored in memory 306. Program instructions or data may constitute portions of software for carrying out the design of a vibration control system for a wellbore logging tool, as described herein. Memory 306 may include any system, device, or apparatus configured to hold and/or house one or more memory modules; for example, memory 306 may include read-only memory, random access memory, solid state memory, or disk-based memory. Each memory module may include any system, device or apparatus configured to retain program instructions and/or data for a period of time (e.g., computer-readable non-transitory media).

Control unit 300 may further include braking signal database 308. Braking signal database 308 may be communicatively coupled to vibration control system 302 and may provide values that may be used to generate a braking signal in response to a query or call by vibration control system 302. Braking signal database 308 may be implemented in any suitable manner, such as by functions, instructions, logic, or code, and may be stored in, for example, a relational database, file, application programming interface, library, shared library, record, data structure, service, software-as-service, or any other suitable mechanism. Braking signal database 308 may include code for controlling its operation such as functions, instructions, or logic. Braking signal database 308 may specify any suitable parameters that may be used to generate a braking signal to reduce the vibration of a logging tool, such as amplitude and phase of the vibration.

Control unit 300 may further include vibration estimation database 312. Vibration estimation database 312 may be communicatively coupled to vibration control system 302 and may provide vibration estimation parameters for a logging tool in response to a query or call by vibration control system 302. Vibration estimation database 312 may be implemented in any suitable manner, such as by functions, instructions, logic, or code, and may be stored in, for example, a relational database, file, application programming interface, library, shared library, record, data structure, service, software-as-service, or any other suitable mechanism. Vibration estimation database 312 may include code for controlling its operation such as functions, instructions, or logic. Vibration estimation database 312 may specify any suitable properties of the logging tool that may be used for estimating the vibration of the logging tool, such as the acceleration, speed, and energy consumption rate of the logging tool. Although control unit 300 is illustrated as including two databases, control unit 300 may contain any suitable number of databases.

In some embodiments, vibration control system 302 may be configured to generate signals for vibration control for a wellbore logging tool. For example, vibration control system 302 may be configured to import one or more instances of braking signal database 308, and/or one or more instances of vibration estimation database 312. Values from braking signal database 308, and/or vibration estimation database 312 may be stored in memory 306. Vibration control system 302 may be further configured to cause processor 304 to execute program instructions operable to generate signals for vibration control for a wellbore logging tool. For example, processor 304 may, based on values in braking signal database 308 and vibration estimation database 312, monitor the vibration of a logging tool as a result of vibration created in the logging tool during and after which the logging tool generates an acoustic signal and may generate a braking signal for the logging tool to dampen the vibration, as discussed in further detail with reference to FIG. 4.

Control unit 300 may be communicatively coupled to one or more displays 316 such that information processed by vibration control system 302 (e.g., input signals for the logging tool) may be conveyed to operators of drilling and logging equipment at the wellsite or may be displayed at a location offsite.

Modifications, additions, or omissions may be made to FIG. 3A without departing from the scope of the present disclosure. For example, FIG. 3A shows a particular configuration of components for control unit 300. However, any suitable configurations of components may be used. For example, components of control unit 300 may be implemented either as physical or logical components. Furthermore, in some embodiments, functionality associated with components of control unit 300 may be implemented in special purpose circuits or components. In other embodiments, functionality associated with components of control unit 300 may be implemented in a general purpose circuit or components of a general purpose circuit. For example, components of control unit 300 may be implemented by computer program instructions. Control unit 300 or components thereof can be located at the surface, downhole (e.g., in the BHA and/or in the logging tool), or some combination of both locations (e.g., certain components could be disposed at the surface and certain components could be disposed downhole, where the surface components are communicatively coupled to the downhole components).

Figure 3B:
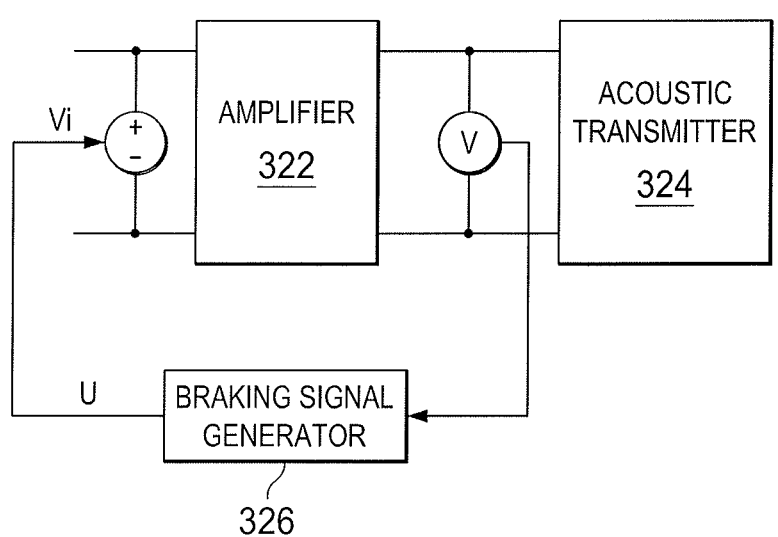
FIG. 3B illustrates a block diagram of an exemplary acoustic wellbore logging tool including a braking signal generator, in accordance with some embodiments of the present disclosure.

FIG. 3B illustrates a block diagram of an exemplary acoustic wellbore logging tool including a braking signal generator, in accordance with some embodiments of the present disclosure. Amplifier 322 and acoustic transmitter 324 may be components of a logging tool, such as logging tool 130 or logging tool 226, shown in FIGS. 1 and 2, respectively. During the listening period, the voltage output from amplifier 322 may be measured and sent to braking signal generator 326. The voltage output from amplifier 322 may be generated by the vibration of acoustic transmitter 324. Braking signal generator 326 may use information about the voltage to determine the amplitude, frequency, or phase of the vibration of acoustic transmitter 324 to generate a braking signal to send to amplifier 322 to dampen the vibration of acoustic transmitter 324.

In the embodiment shown in FIG. 3B, the braking signal may be generated based on the measurement of the output voltage of amplifier 322 and no other measurements. The magnitude of the output voltage of amplifier 322 may correspond to the magnitude of the vibration of acoustic transmitter 324. For example, an output voltage of amplifier 322 having a small magnitude may correspond to a vibration of acoustic transmitter 324 having a small magnitude. The magnitude of the output voltage of amplifier 322 and the vibration of acoustic transmitter 324 may not be completely reduced to zero after one or more braking signals due to noise.

The vibrations of a logging tool may be defined as a second order linear oscillator system. In some embodiments, three quantities may be used to describe the vibration of the logging tool, such as logging tool 130 as shown in FIG. 1 or logging tool 226 as shown in FIG. 2, at any specific time: magnitude, phase, and frequency. Each of the three quantities may be used to provide vibration control for the logging tool. By estimating each of the three quantities for the logging tool, based on the output signal of the logging tool, vibration control may be provided without requiring a model of the vibration of the logging tool. This may be desirable in situations where it may be difficult to obtain a model or in situations where a model may not be sufficiently accurate.

Figure 4:
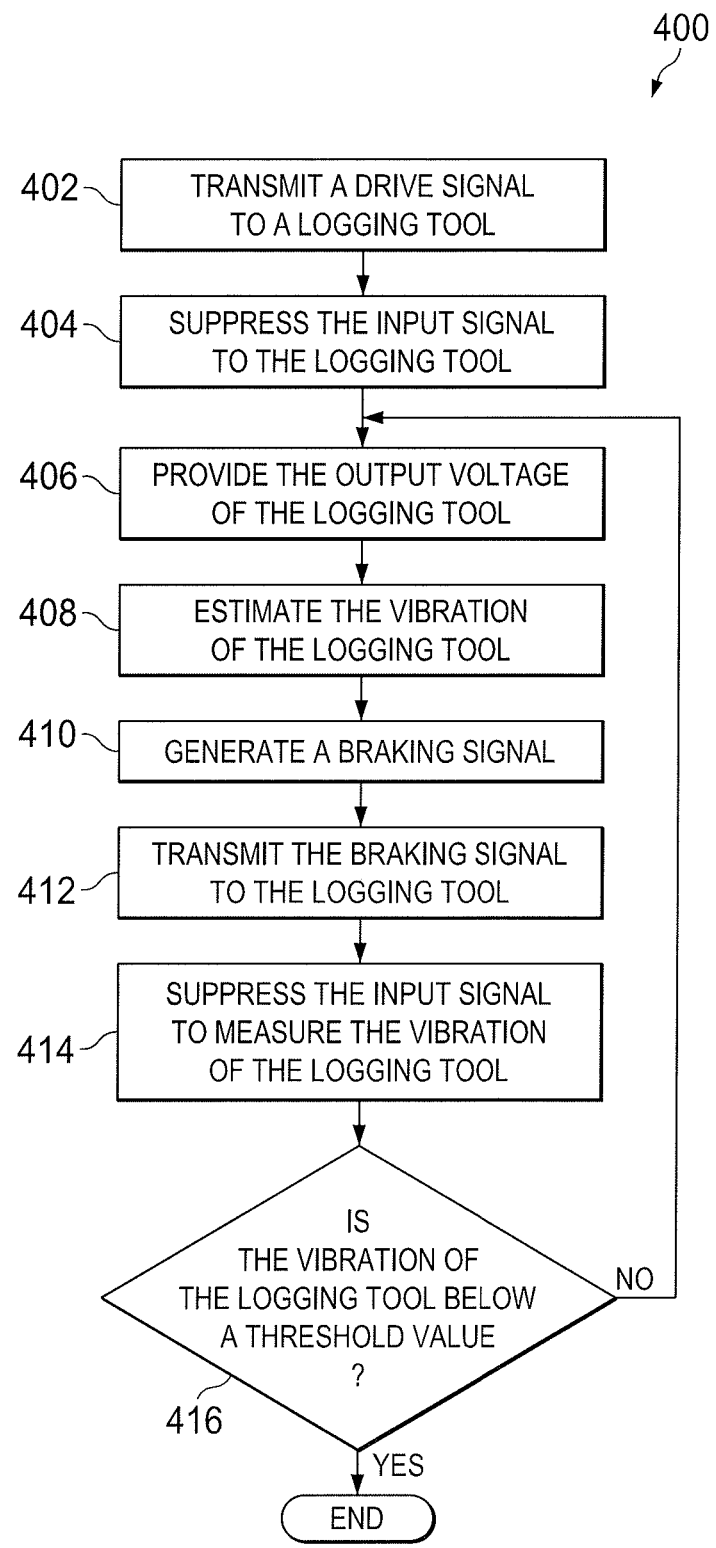
FIG. 4 illustrates a flow chart of a method of vibration control for a wellbore logging tool, in accordance with some embodiments of the present disclosure.

FIG. 4 illustrates a flow chart of a method 400 for vibration control of a wellbore logging tool, in accordance with some embodiments of the present disclosure. The steps of method 400 may be performed by various computer programs, models, or any combination thereof, configured to simulate and design drilling systems, apparatuses and devices, such as the vibration control system illustrated in FIG. 3A. For illustrative purposes, method 400 is described with respect to the drilling or logging system as illustrated in the previous FIGURES; however, method 400 may be used to provide vibration control for any logging tool in any drilling or logging system.

Method 400 may begin at step 402 where the vibration control system may transmit a drive signal to the logging tool which may cause the logging tool to generate an acoustic signal. The acoustic signal may be used to calculate the properties of a subterranean formation by recording the travel time of the acoustic signal through the formation. The acoustic signal may propagate through the formation to at least one receiver. The receiver may record the elapsed time between when the acoustic signal is emitted by the logging tool and when the acoustic signal is received by the receiver and the elapsed time may be used to calculate the speed of the acoustic signal through the subterranean formation. The speed of sound through various types of rocks and fluid are known and the elapsed time may be compared to the known values to determine the properties of the formation. When the logging tool generates an acoustic signal, it may cause the logging tool to vibrate at a frequency in the range of the desired acoustic signal. The vibration may result in lower quality data, may increase the time required to perform the logging, and may require more energy input into the logging tool.

To reduce the vibration of the logging tool, at step 404, the logging tool vibration control system may suppress the input signal until the transient response of the logging tool, caused by the drive signal, has dissipated. The output signal may then be provided for a period of time referred to as the "listening period" and may depend on the damping characteristics of the logging tool. During the listening period, the input signal to the logging tool may remain suppressed. The listening period may be long enough to monitor the vibration of the logging tool and provide the output signal of the logging tool, as described with respect to step 406. The duration of the listening period may provide a desired level of accuracy for estimating the vibration of the logging tool, as performed in step 408, and may vary based on the amplitude of the vibration of the logging tool.

At step 406, the logging tool vibration control system may provide the output signal of the logging tool. The output signal may composed of three major components: an input component generated by the input signal transmitted by a control unit to the logging tool; a vibration component generated by vibration of one or more components the logging tool; and a residual component generated by the transient response of the logging tool, as described in more detail with respect to FIG. 1. Other components of the output signal may exist, but the other components may be minor and may not have a significant effect on the steps of method 400. Therefore the output signal of the logging tool may be determined by providing each of the three primary components of the output signal.

At step 408, the logging tool vibration control system may estimate the vibration of the logging tool based on the output signal provided in step 406. The vibration estimated by the logging tool vibration control system may include the magnitude, the phase, and the frequency of the vibration of the logging tool and may be estimated using any known method for estimating the vibration of a second-order linear oscillatory system. For example, the mapping of the output signal to the vibration of the logging tool may be based on experimental results or may be based on mathematical models of the logging tool. In some embodiments, the frequency of the vibration may be estimated by determining the number of times the voltage signal crosses the zero value in a given period of time, the magnitude of the vibration may be estimated by measuring the magnitude of the voltage signal, and the phase of the vibration may be estimated by determining the times at which the voltage signal crosses the zero value.

At step 410, the logging tool vibration control system may generate a braking signal based on the estimated vibration of the logging tool as estimated in step 408 and/or the output signal as provided in step 406. The braking signal may be generated for the purpose of reducing the vibration of the logging tool. In situations where the vibration of the logging tool is large, the braking signal may have a large voltage magnitude. The duration and form of the braking signal may be selected based on experimental results, simulations, or mathematical models. For example, the braking signal may be generated based on a mathematical formula, such as Equation 1, or on a pre-determined template waveform using Equation 2. In some embodiments, the braking signal may be generated to optimize the effect of the braking signal on the vibration of the logging tool. For example, the braking signal may be generated to begin when the vibration of the logging tool is at a particular point in the vibration cycle such that the braking signal will have the maximum damping effect on the logging tool.

At step 412, the logging tool vibration control system may transmit the braking signal to the logging tool and the braking signal may cause the logging tool to vibrate offset from the previous vibration of the logging tool. The effects of the braking signal may cancel out the vibration due to the drive signal and therefore damp out the vibration of the logging tool. The braking signal may not be transmitted to the logging tool during the listening period in step 404 because the input component of the output signal, generated by the input voltage of the drive signal, is suppressed while providing the output signal of the logging tool in step 412. In some embodiments, the logging tool vibration control system may be a component of the logging tool and the braking signal provided to another component of the logging tool such as an amplifier similar to amplifier 322 shown in FIG. 3B.

At step 414, the logging tool vibration control system may suppress the signal input to the logging tool and may monitor the vibration of the logging tool during a second listening period after the braking signal has been transmitted to the logging tool. Step 414 may be similar to step 404. During the second listening period, the logging tool vibration control system may monitor the effect of the braking signal on the vibration of the logging tool.

At step 416, the logging tool vibration control system may determine whether the vibration of the logging tool is below a predetermined threshold value where the threshold is based on a level of vibration of the logging tool that may be deemed to not impact the results of the subterranean operation. If the vibration of the logging tool is not below the threshold value, method 400 may return to step 406 to provide the output signal of the logging tool, estimate the vibration of the logging tool, and generate a second braking signal. If the vibration of the logging tool is below the threshold value, method 400 may be complete and the vibration of the logging tool may be sufficiently damped.

Due to factors that may not be estimated in method 400, such as measurement noise or estimation error, the vibration of the logging tool may not be sufficiently damped out after applying one braking signal. Therefore the steps of method 400 may be repeated multiple times. In some embodiments, method 400 may control the vibration of the logging tool in a single firing cycle. In other embodiments, method 400 may control the vibration of the logging tool over multiple firing cycles, method 400 may use the output signal of the logging tool, as provided in step 406 of a previous firing cycle, and the effect of the braking signal, as monitored in step 414 of a previous firing cycle, to improve the braking signal generated in step 410 of a subsequent firing cycle to more quickly and effectively dampen the vibration of the logging tool in the subsequent firing cycle.

Modifications, additions, or omissions may be made to method 400 without departing from the scope of the present disclosure. For example, the order of the steps may be performed in a different manner than that described and some steps may be performed at the same time. Additionally, each individual step may include additional steps without departing from the scope of the present disclosure.

Figure 5A:
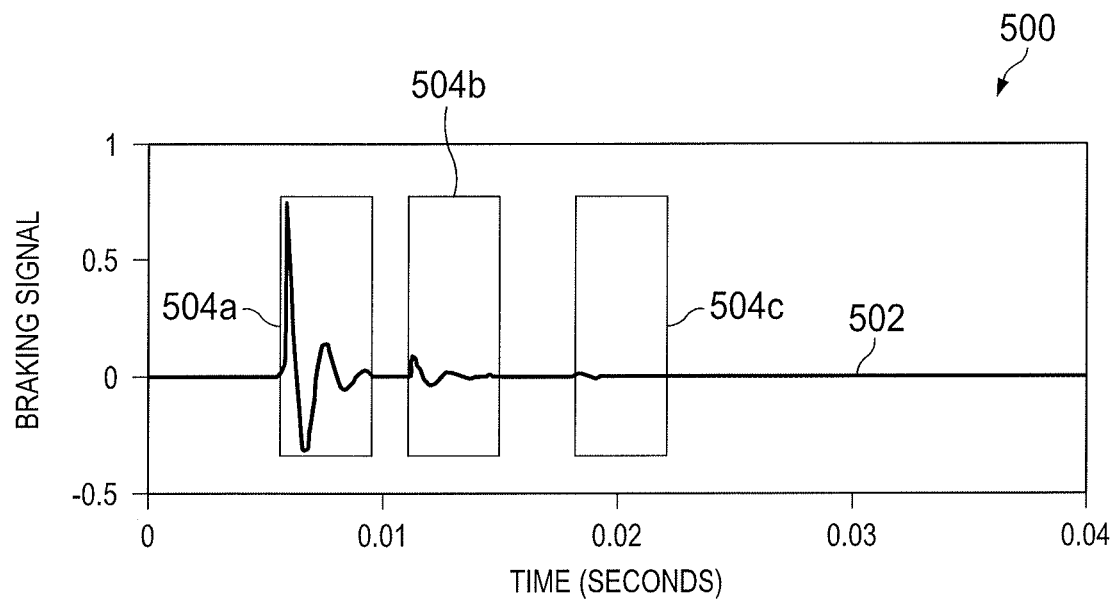
FIGS. 5A and 5B illustrate the results from an exemplary embodiment of the method shown in FIG. 4, in accordance with some embodiments of the present disclosure.
Figure 5B:
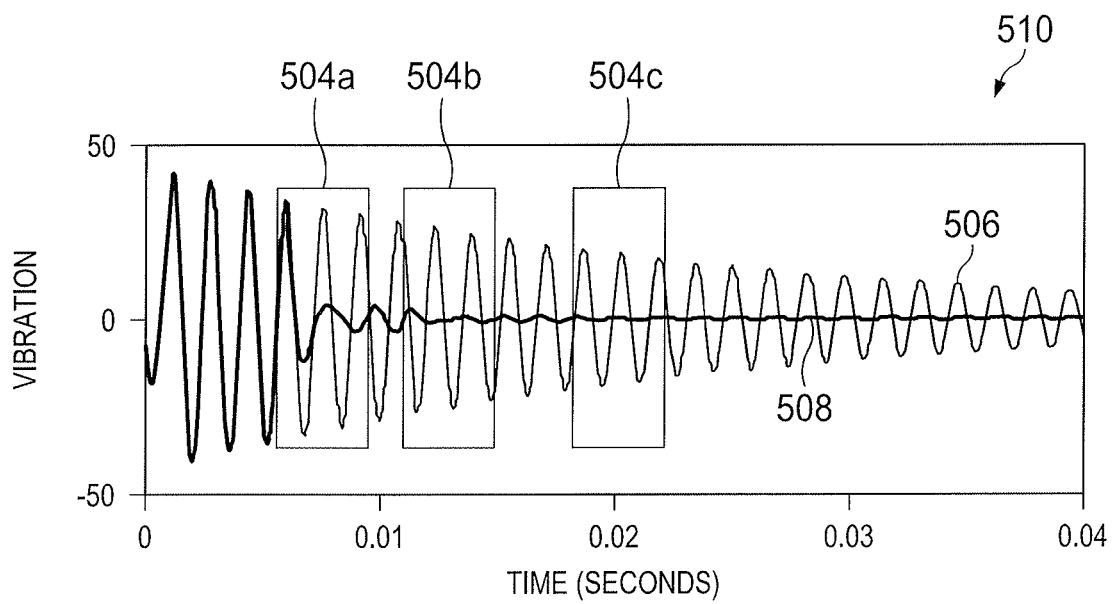

FIGS. 5A and 5B illustrate the results from an exemplary embodiment of the method shown in FIG. 4, in accordance with some embodiments of the present disclosure. A simulation was performed comparing a logging tool without any damping control to a logging tool using the damping control method described with respect to FIG. 4. FIG. 5A illustrates the braking signal applied to the logging tool. In the simulation illustrated in FIGS. 5A and 5B, three braking signals were generated and transmitted to the logging tool. Boxes 504a, 504b, and 504c illustrate the period of time during which the braking signal was applied. Braking signal 502 was not identical for each time period shown in boxes 504a, 504b, and 504c and was adjusted based on the estimated vibration of the logging tool, as shown in FIG. 5B.

In FIG. 5B, the vibration of the logging tool without any damping control, other than the inherent mechanical damping of the system, is shown by curve 506. The vibration of the logging tool with the disclosed vibration control method is shown by curve 508. The logging tool with the disclosed damping control method exhibits reduced acceleration within less than 0.01-seconds after the first braking signal is applied. The second and third braking signals further reduce the vibration. The magnitude of the vibration is reduced each time braking signal 502 is applied until the vibration is nearly zero. The logging tool without any damping control exhibits large amounts of acceleration for a longer period of time.

To provide illustrations of one or more embodiments of the present disclosure, the following examples are provided. In one embodiment, a method of vibration control for a wellbore logging tool may include measuring an initial output signal of a wellbore logging tool, generating a first braking signal based on the initial output signal of the wellbore logging tool, and transmitting the first braking signal to the wellbore logging tool to reduce the vibration of the wellbore logging tool.

In certain aspects of the disclosed method, the method may further include suppressing, after the first braking signal is transmitted to the wellbore logging tool, an input signal to the wellbore logging tool for a duration of time, providing a subsequent output signal of the wellbore logging tool, determining whether a subsequent vibration of the wellbore logging tool is below a threshold, and, based on the determination, generating a second braking signal based on the subsequent output signal of the wellbore logging tool; and transmitting the second braking signal to the wellbore logging tool. The second braking signal may be designed to reduce the vibration of the wellbore logging tool.

In one or more of the previously described aspects of the disclosed method, the method may further include that the duration of time is based on at least one of a characteristic of the wellbore logging tool, an accuracy of the estimation, or a characteristic of an input signal. In one or more of the previously described aspects of the disclosed method, the method may further include suppressing an input signal to the wellbore logging tool for a duration of time. In one or more of the previously described aspects of the disclosed method, the method may further include generating the first or second braking signal based on an estimation of the vibration of the wellbore logging tool. The estimation may be based on the initial or subsequent output signal of the wellbore logging tool. The estimation may include estimating at least one of a phase, a magnitude, or a frequency of the vibration of the wellbore logging tool. In one or more of the previously described aspects of the disclosed method, the method may further include generating the first or second braking signal by optimizing an effectiveness of the first or second braking signal. In one or more of the previously described aspects of the disclosed method, the method may further include that the vibration of the wellbore logging tool is damped in a single firing cycle. In one or more of the previously described aspects of the disclosed method, the method may further include that the vibration of the wellbore logging tool is damped in multiple firing cycles where the first braking signal may be generated during the first filing cycle and the second braking signal may be generated during the second firing cycle. In one or more of the previously described aspects of the disclosed method, the method may further include where the initial or subsequent output signal may include at least one of an input component, a vibration component, or a residual component.

In another embodiment, a non-transitory machine-readable medium may include instructions stored therein, the instructions executable by one or more processors to facilitate performing a method of vibration control for a wellbore logging tool. The method may include measuring an initial output signal of a wellbore logging tool, generating a first braking signal based on the initial output signal of the wellbore logging tool, and transmitting the first braking signal to the wellbore logging tool to reduce the vibration of the wellbore logging tool.

In certain aspects, the disclosed non-transitory machine-readable medium may further include suppressing, after the first braking signal is transmitted to the wellbore logging tool, an input signal to the wellbore logging tool for a duration of time, providing a subsequent output signal of the wellbore logging tool, determining whether a subsequent vibration of the wellbore logging tool is below a threshold, and, based on the determination, generating a second braking signal based on the subsequent output signal of the wellbore logging tool; and transmitting the second braking signal to the wellbore logging tool, the second braking signal designed to reduce the vibration of the wellbore logging tool.

In one or more of the previously described aspects of the disclosed non-transitory machine-readable medium, the non-transitory machine-readable medium may further include that the duration of time may be based on at least one of a characteristic of the wellbore logging tool, an accuracy of the estimation, or a characteristic of an input signal. In one or more of the previously described aspects of the disclosed non-transitory machine-readable medium, the non-transitory machine-readable medium may further include suppressing an input signal to the wellbore logging tool for a duration of time. In one or more of the previously described aspects of the disclosed non-transitory machine-readable medium, the non-transitory machine-readable medium may further include that generating the first or second braking signal is based on an estimation of the vibration of the wellbore logging tool. The estimation is based on the initial or subsequent output signal of the wellbore logging tool. The estimation may include estimating at least one of a phase, a magnitude, or a frequency of the vibration of the wellbore logging tool. In one or more of the previously described aspects of the disclosed non-transitory machine-readable medium, the non-transitory machine-readable medium may further include generating a first or second braking signal by optimizing an effectiveness of the first or second braking signal. In one or more of the previously described aspects of the disclosed non-transitory machine-readable medium, the non-transitory machine-readable medium may further include that the vibration of the wellbore logging tool is damped in a single firing cycle. In one or more of the previously described aspects of the disclosed non-transitory machine-readable medium, the non-transitory machine-readable medium may further include that the vibration of the wellbore logging tool is damped in multiple firing cycles, where the first braking signal is generated during the first firing cycle and the second braking signal is generated during the second firing cycle. In one or more of the previously described aspects of the disclosed non-transitory machine-readable medium, the non-transitory machine-readable medium may further include that the initial or subsequent output signal includes at least one of an input component, a vibration component, or a residual component.

In yet another embodiment, a wellbore logging system includes a wellbore, a drill string, a wellbore logging tool coupled to the drill string, and a vibration control system communicatively coupled to the wellbore logging tool. The vibration control system may include a processor and a memory. The memory may be communicatively coupled to the processor with computer program instructions stored therein, the instructions, when executed by the processor, cause the processor to provide vibration control for the wellbore logging tool by: measuring an initial output signal of the wellbore logging tool, generating a first braking signal based on the initial output signal of the wellbore logging tool, and transmitting the first braking signal to the wellbore logging tool to reduce the vibration of the wellbore logging tool.

In certain aspects, the disclosed vibration control system may further include suppressing, after the first braking signal is transmitted to the wellbore logging tool, an input signal to the wellbore logging tool for a duration of time, providing a subsequent output signal of the wellbore logging tool, determining whether a subsequent vibration of the wellbore logging tool is below a threshold, and, based on the determination, generating a second braking signal based on the subsequent output signal of the wellbore logging tool; and transmitting the second braking signal to the wellbore logging tool, the second braking signal designed to reduce the vibration of the wellbore logging tool.

In one or more of the previously described aspects of the disclosed control system, the vibration control system may further include that the duration of time is based on at least one of a characteristic of the wellbore logging tool, an accuracy of the estimation, or a characteristic of an input signal. In one or more of the previously described aspects of the disclosed control system, the vibration control system may further include suppressing an input signal to the wellbore logging tool for a duration of time. In one or more of the previously described aspects of the disclosed control system, the vibration control system may further include that generating the first or second braking signal is based on an estimation of the vibration of the wellbore logging tool. The estimation based on the initial or subsequent output signal of the wellbore logging tool. The estimation may include estimating at least one of a phase, a magnitude, or a frequency of the vibration of the wellbore logging tool. In one or more of the previously described aspects of the disclosed control system, the vibration control system may further include generating a first or second braking signal by optimizing an effectiveness of the first or second braking signal. In one or more of the previously described aspects of the disclosed control system, the vibration control system may further include that the vibration of the wellbore logging tool is damped in a single firing cycle. In one or more of the previously described aspects of the disclosed control system, the vibration control system may further include that the vibration of the wellbore logging tool is damped in multiple firing cycles, where the first braking signal is generated during the first firing cycle and the second braking signal is generated during the second firing cycle. In one or more of the previously described aspects of the disclosed control system, the vibration control system may further include that the initial or subsequent output signal includes at least one of an input component, a vibration component, or a residual component.

In yet another embodiment, a wellbore logging system includes a wellbore, a conveyance, a wellbore logging tool connected to the conveyance and suspended in the wellbore, and a vibration control system communicatively coupled to the wellbore logging tool. The vibration control system may include a processor and a memory. The memory may be communicatively coupled to the processor with computer program instructions stored therein, the instructions, when executed by the processor, cause the processor to provide vibration control for the wellbore logging tool by: measuring an initial output signal of the wellbore logging tool, generating a first braking signal based on the initial output signal of the wellbore logging tool, and transmitting the first braking signal to the wellbore logging tool to reduce the vibration of the wellbore logging tool.

In certain aspects, the disclosed vibration control system may further include suppressing, after the first braking signal is transmitted to the wellbore logging tool, an input signal to the wellbore logging tool for a duration of time, providing a subsequent output signal of the wellbore logging tool, determining whether a subsequent vibration of the wellbore logging tool is below a threshold, and, based on the determination, generating a second braking signal based on the subsequent output signal of the wellbore logging tool; and transmitting the second braking signal to the wellbore logging tool, the second braking signal designed to reduce the vibration of the wellbore logging tool.

In one or more of the previously described aspects of the disclosed control system, the vibration control system may further include that the duration of time is based on at least one of a characteristic of the wellbore logging tool, an accuracy of the estimation, or a characteristic of an input signal. In one or more of the previously described aspects of the disclosed control system, the vibration control system may further include suppressing an input signal to the wellbore logging tool for a duration of time. In one or more of the previously described aspects of the disclosed control system, the vibration control system may further include that generating the first or second braking signal is based on an estimation of the vibration of the wellbore logging tool. The estimation based on the initial or subsequent output signal of the wellbore logging tool. The estimation may include estimating at least one of a phase, a magnitude, or a frequency of the vibration of the wellbore logging tool. In one or more of the previously described aspects of the disclosed control system, the vibration control system may further include generating a first or second braking signal by optimizing an effectiveness of the first or second braking signal. In one or more of the previously described aspects of the disclosed control system, the vibration control system may further include that the vibration of the wellbore logging tool is damped in a single firing cycle. In one or more of the previously described aspects of the disclosed control system, the vibration control system may further include that the vibration of the wellbore logging tool is damped in multiple firing cycles, where the first braking signal is generated during the first firing cycle and the second braking signal is generated during the second firing cycle. In one or more of the previously described aspects of the disclosed control system, the vibration control system may further include that the initial or subsequent output signal includes at least one of an input component, a vibration component, or a residual component.

Although the present disclosure and its advantages have been described in detail, it should be understood that various changes, substitutions and alterations can be made herein without departing from the spirit and scope of the disclosure as defined by the following claims. For example, while the embodiment discussed describes calculation of the optimal drive signal based on estimated parameters, however the optimal drive signal may be calculated based on measurements provided by the logging tool.

What is claimed is:
1. A method of vibration control for a wellbore logging tool, the method comprising:
  generating, by vibration of an acoustic transmitter of the wellbore logging tool, an output of an amplifier of the wellbore logging tool, wherein the amplifier is coupled to the acoustic transmitter;
  sending the output to a braking signal generator of the wellbore logging tool;
  generating a first braking signal based on the output;
  transmitting the first braking signal to the amplifier to dampen the vibration of the acoustic transmitter;
  suppressing, after the first braking signal is transmitted to the acoustic transmitter, an input signal to the wellbore logging tool for a duration of time;
  providing a subsequent output signal of the wellbore logging tool;
  determining whether a subsequent vibration of the wellbore logging tool is below a threshold; and
  based on the determination:
    generating a second braking signal based on the subsequent output signal of the wellbore logging tool; and
    transmitting the second braking signal to the wellbore logging tool, the second braking signal designed to reduce the subsequent vibration of the wellbore logging tool.

2. The method of claim 1, wherein the duration of time is based on at least one of a characteristic of the wellbore logging tool, an accuracy of an estimation, or a characteristic of an input signal.

3. The method of claim 1, further comprising suppressing an input signal to the wellbore logging tool for the duration of time.

4. The method of claim 1, wherein generating the first braking signal or the second braking signal is further based on an estimation of the vibration of the wellbore logging tool, the estimation based on the output or the subsequent output signal of the wellbore logging tool.

5. The method of claim 4, wherein the estimation includes estimating at least one of a phase, a magnitude, or a frequency of the vibration of the wellbore logging tool.

6. The method of claim 1, wherein generating the first braking signal or the second braking signal includes optimizing an effectiveness of the first braking signal or the second braking signal.

7. The method of claim 1, wherein the vibration of the wellbore logging tool is damped in a single firing cycle.

8. The method of claim 1, wherein the vibration of the wellbore logging tool is damped in multiple firing cycles, where the first braking signal is generated during the first firing cycle and the second braking signal is generated during the second firing cycle.

9. The method of claim 1, wherein the output or the subsequent output signal includes at least one of an input component, a vibration component, or a residual component.

10. The method of claim 1, wherein the threshold is based on a level of vibration that does not impair one or more results of a subterranean operation.

11. A wellbore logging system, comprising:
a wellbore;
a conveyance;
a wellbore logging tool connected to the conveyance and suspended in the wellbore; and
a vibration control system communicatively coupled to the wellbore logging tool, the vibration control system including:
a processor; and
a memory communicatively coupled to the processor with computer program instructions stored therein, the instructions, when executed by the processor, cause the processor to:
generate, by vibration of an acoustic transmitter of the wellbore logging tool, an output of an amplifier of the wellbore logging tool, wherein the amplifier is coupled to the acoustic transmitter;
sending the output to a braking signal generator of the wellbore logging tool;
generate a first braking signal based on the output;
transmit the first braking signal to the amplifier to dampen the vibration of the acoustic transmitter;
suppress, after the first braking signal is transmitted to the acoustic transmitter, an input signal to the wellbore logging tool for a duration of time;
provide a subsequent output signal of the wellbore logging tool;
determine whether a subsequent vibration of the wellbore logging tool is below a threshold; and
based on the determination:
generate a second braking signal based on the subsequent output signal of the wellbore logging tool; and
transmit the second braking signal to the wellbore logging tool, the second braking signal designed to reduce the subsequent vibration of the wellbore logging tool.

12. The wellbore logging system of claim 11, wherein the duration of time is based on at least one of a characteristic of the wellbore logging tool, an accuracy of an estimation, or a characteristic of an input signal.

13. The wellbore logging system of claim 11, further comprising suppressing an input signal to the wellbore logging tool for the duration of time.

14. The wellbore logging system of claim 11, wherein generating the first braking signal or the second braking signal is further based on an estimation of the vibration of the wellbore logging tool, the estimation based on the output or the subsequent output signal of the wellbore logging tool.

15. The wellbore logging system of claim 14, wherein the estimation includes estimating at least one of a phase, a magnitude, or a frequency of the vibration of the wellbore logging tool.

16. The wellbore logging system of claim 11, wherein generating the first braking signal or the second braking signal includes optimizing an effectiveness of the first braking signal or the second braking signal.

17. The wellbore logging system of claim 11, wherein the vibration of the wellbore logging tool is damped in a single firing cycle.

18. The wellbore logging system of claim 11, wherein the vibration of the wellbore logging tool is damped in multiple firing cycles, where the first braking signal is generated during the first firing cycle and the second braking signal is generated during the second firing cycle.

19. The wellbore logging system of claim 11, wherein the output or subsequent output signal includes at least one of an input component, a vibration component, or a residual component.

20. The wellbore logging system of claim 11, wherein the threshold is based on a level of vibration that does not impair one or more results of a subterranean operation.

* * * * *